(12) United States Patent
Caldwell (10) Patent No.: US 9,940,669 B2
(45) Date of Patent: Apr. 10, 2018

(54) FLEXIBLE OPEN ORIGINATION

(71) Applicant: MX TECHNOLOGIES, INC., Lehi, UT (US)

(72) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 760 days.

(21) Appl. No.: 14/494,560

(22) Filed: Sep. 23, 2014

(65) Prior Publication Data

US 2015/0120425 A1 Apr. 30, 2015

Related U.S. Application Data

(63) Continuation-in-part of application No. 13/815,562, filed on Mar. 8, 2013.

(51) Int. Cl.
*G06Q 40/00* (2012.01)
*G06Q 40/02* (2012.01)
(Continued)

(52) U.S. Cl.
CPC .......... *G06Q 40/02* (2013.01); *G06Q 20/108* (2013.01); *G06Q 20/3221* (2013.01); *G06Q 20/3223* (2013.01); *G06Q 20/4012* (2013.01); *G06Q 20/425* (2013.01); *G06Q 30/0226* (2013.01); *G06Q 30/0255* (2013.01); *G06Q 30/0261* (2013.01); *G06Q 30/0269* (2013.01)

(58) Field of Classification Search
CPC .......... G06Q 30/0207–30/0239; G06Q 40/02
See application file for complete search history.

(56) References Cited

U.S. PATENT DOCUMENTS 7,529,710 B1 5/2009 Clower et al.
2007/0053518 A1 3/2007 Tompkins
(Continued)

OTHER PUBLICATIONS

Wallen, Jack, "Track your finances from your mobile with Mint", Jun. 13, 2012, TechRepublic.*
(Continued)

*Primary Examiner* — Eric T Wong
(74) *Attorney, Agent, or Firm* — Kunzler, PC (57) ABSTRACT

The disclosure extends to computer-implemented personal financial management tools, methods and systems for providing financial transaction data to users and attracting origination customers to a financial institution within a financial business computing environment. The disclosure also extends to a flexible Open Origination that allows any type of mobile, internet, online, personal financial management software, finance tool, or other useful function, device or software, that a bank or financial institution provides to account holders, and offers that same functionality to all users, regardless of their account status. Non-account holders can download and utilize the Banking Software in question in order to enjoy its features, and to become familiar with the experience of doing business with the bank or financial institution that provides the software. This method, system and software allows any user, regardless of where his/her accounts are located, to use the financial software and benefit from its functionality.

26 Claims, 9 Drawing Sheets

(51) Int. Cl.
*G06Q 30/02* (2012.01)
*G06Q 20/10* (2012.01)
*G06Q 20/32* (2012.01)
*G06Q 20/40* (2012.01)
*G06Q 20/42* (2012.01)

(56) References Cited

U.S. PATENT DOCUMENTS

| | | | |
|---|---|---|---|
| 2007/0061300 A1* | 3/2007 | Ramer | G06Q 30/02 |
| 2007/0255662 A1 | 11/2007 | Tumminaro | |
| 2011/0028160 A1* | 2/2011 | Roeding | G06Q 30/00 |
| | | | 455/456.1 |
| 2012/0035990 A1* | 2/2012 | Lewis | G06Q 30/0207 |
| | | | 705/14.1 |
| 2012/0036003 A1* | 2/2012 | Tong | G06Q 30/0207 |
| | | | 705/14.39 |
| 2012/0254002 A1 | 10/2012 | Kundagrami | |
| 2012/0265604 A1* | 10/2012 | Corner | G06Q 30/02 |
| | | | 705/14.39 |
| 2015/0019307 A1* | 1/2015 | Girard | G06Q 30/0207 |
| | | | 705/14.12 |
| 2015/0281222 A1* | 10/2015 | Burch | H04L 63/0838 |
| | | | 726/6 |

OTHER PUBLICATIONS

U.S. Office Action dated Mar. 19, 2014 in U.S. Appl. No. 13/815,562.
U.S. Office Action dated Jul. 8, 2015 in U.S. Appl. No. 13/815,562.
U.S. Appl. No. 13/815,562 Office Action dated Jul. 5, 2017.

* cited by examiner

FLEXIBLE OPEN ORIGINATION

CROSS-REFERENCE TO RELATED APPLICATIONS

This application is a continuation-in-part of co-pending U.S. patent application Ser. No. 13/815,562, filed Mar. 8, 2013, entitled "FLEXIBLE OPEN ORIGINATION," which is hereby incorporated by reference herein in its entirety, including but not limited to those portions that specifically appear hereinafter, the incorporation by reference being made with the following exception: In the event that any portion of the above-referenced application is inconsistent with this application, this application supersedes said portion of said above-referenced application.

STATEMENT REGARDING FEDERALLY SPONSORED RESEARCH OR DEVELOPMENT

Not applicable.

FIELD OF THE DISCLOSURE

The disclosure relates generally to computer-implemented personal financial management tools, methods and systems, and more particularly, but not necessarily entirely, to computer-implemented personal financial management tools, methods and systems that provide financial transaction data to a user, along with a flexible open origination that allows any type of mobile, internet, online, personal financial management software, finance tool, or other useful function, device or software, that a bank or financial institution provides to account holders, and offers that same functionality to all users, which allows any user regardless of account status to enjoy the same functionality and features.

BACKGROUND

Many personal financial management tools or software programs or products assist a user in tracking, budgeting or otherwise maintaining the user's finances. Such personal financial management tools or software products track current financial activity, such as bill paying, account reconciliation and budgeting, as well as long-term financial planning, such as saving for a home or investing for retirement. Typically, when a bank or other financial institution offers such personal financial management tools or software products they only allow the user to access the user's own bank account or other financial account that the user has with that particular bank or other financial institution, but not with third party banks or financial institutions.

What is needed are methods and systems that are efficient at attracting origination customers to a financial institution within a financial business computing environment. As will be seen, the disclosure provides such methods and systems that can attract origination customers to a financial institution within a financial business computing environment in an effective and elegant manner.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified.

Advantages of the disclosure will become better understood with regard to the following description and accompanying drawings where.

DETAILED DESCRIPTION

What is needed are methods and systems that are efficient at attracting origination customers to a financial institution within a financial business computing environment. The disclosure extends to computer-implemented personal financial management tools, methods and systems for attracting origination customers to a financial institution within a financial business computing environment in accordance with the teachings and principles of the disclosure.

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

It will be appreciated that banks, credit unions and other financial institutions (sometimes referred to herein as "FIs") often provided software for their account holders to conduct banking transactions and other financial transactions and otherwise manage their finances from a computer or mobile electronic device, such as a laptop computer, notebook computer, personal data assistant, smart phone or other electronic device that a person can readily transport with him/her (sometimes referred to herein collectively as "Computing Device(s)"). Such banking software allowed users to conduct various types of financial transactions, make deposits, transfers, pay bills, wire transfers, view accounts, etc. (sometimes referred to herein as "Standard Banking Software"). It will be understood and appreciated that many account holders insist that their FI provide Standard Banking Software, or the account holder will move funds, loans, their relationship or other connections to a new FI.

Standard Banking Software can also be dovetailed with, or include, Personal Financial Management ("PFM") software that provides additional functionality, such as tracking income, expenses, budgeting, net worth analysis, etc. Personal Financial Management software can also be configured to manage the financial affairs of an individual with accounts at various financial institutions.

When a non-account holder would like to use the PFM software that another FI provides, but the non-account holder does not have an account with that particular FI, then either the non-account holder cannot use the Standard Banking Software at all, or can only use the Standard Banking Software for very simple, typically non-financial, functions such as locating a local branch of the bank or financial institution. Therefore persons without an account at a particular FI have little to no idea what software services and functionality that FI may offer. As a consequence, the non-account holder end user consumer has very limited options in Standard Banking Software, and rather than having the ability to choose the software of his or her liking, the end user is restricted to that Standard Banking Software offered by his or her particular FI.

As a potential customer of a particular FI, the non-account holder has no significant or true "hands on" way to experience, or develop an impression of the experience, of using that FI without actually opening an account, transferring money and engaging in various financial transactions to enjoy an actual account holder experience with the FI and its PFM software, if offered.

It will be appreciated that the FI may have the best (or worst) Standard Banking Software available in the industry and the most positive (or worst) user experience, but potential customers simply do not have an optimal way to truly confirm or directly experience that software or experience in advance. The primary method for customers to distinguish among banks and financial institutions (and financial software, if any) is sales slogans, trademarks/logos, fee structures and quick snippets on TV, billboards, radio or the like that attempts to partially describe their software offering. There is presently no mode of allowing potential new users, specifically non-account holders, to gain access to the software that a bank has to offer. That is because Standard Banking Software is typically reserved for existing account holders of that particular FI. Thus, without the time-consuming, and often undesirable and difficult process of opening an account at a new FI, or other time-consuming research method, there is no mode of allowing potential new users and non-account holders to gain access to the software that a bank has to offer.

Similarly, FIs presently have no opportunity (or limited opportunities), in a near unrestricted manner, to contribute to the banking community and to broaden their potential customer base by offering the near complete or totally complete functionality (or a partial set thereof), features, and benefits of the particular Standard Banking Software that they have developed or otherwise offer to their account holders. Although some FIs see the Standard Banking Software merely as a necessary evil in order to retain account holders, it is possible that in the future others may wish to provide the best and most robust Standard Banking Software possible to attract and serve customers, and offer such software to the general population, in order to build their brand or altruistically serve the banking or financial community at large.

For the fields of banking, financial services and PFM, a flexible and Open Origination is disclosed that supports an entity, such as an FI, to provide any end-user, not just end-users that have existing accounts or connections to the FI, use of the Open Origination Financial Software that the FI provides. This allows the end-user to view transactional banking or transactional detail (preferably that was gathered, acquired or generated in a non-manual way), or views that were created using the above-mentioned transaction detail, from accounts or relationships that may or may not be related to the FI providing the Financial Software, via that Financial Software. The Open Origination Financial Software may include any software that is in any way financial in nature regardless of how it is delivered, consumed, packaged or referenced by any industry or party.

The transactional detail provided by the Open Origination Financial Software may include certain information, such as (but is not limited to) the date of a transaction, the amount of the transaction, the description of the transaction and the category of the transaction, along with other potential features or functions. The Financial Software may also provide other functions that either are or could be derived from that transactional detail. Those functions may include, but are not limited to, capabilities such as account balance, spending pie, other category breakdown and budgeting information, to name a few.

This certain Open Origination Financial Software will provide, at its most basic level, transactional detail (that was gathered, acquired or generated in a non-manual way), which may include certain information, such as (but is not limited to) date of the transaction, amount of the transaction, description of the transaction and the category of the transaction, etc. The Open Origination Financial Software may also provide other functions, but is not limited to, capabilities such as account balance, spending category and budgeting information, to name a few.

Specifically, non-account holders and account holders of a particular FI alike, can download and utilize the Open Origination Financial Software in order to enjoy its (full, nearly full or certain aspects of) functionality and features, and be further able to become familiar with the experience of doing business with the particular FI that provides the Financial Software.

This newly invented method, system, and software allows any user, regardless of where his/her accounts are held, to use the Open Origination Financial Software provided by an FI. It also allows the FI to offer the Open Origination Financial Software both to its own account holders and to the general financial services customer community as a whole, and allow all users (both account holders and non-account holders of the FI offering the Open Origination Financial Software) benefit from the functionality of the Financial Software. The disclosure provides a previously non-existent intermediate step of a user downloading and actually using the functionality (whether complete or partial) of new Open Origination Financial Software provided by a FI even by those who do not have an account with the FI. The Open Origination Financial Software of the disclosure allows any individual to access certain of their financial information within the Open Origination Financial Software and use the Financial Software, at its minimum, to view transactional detail as explained above, but could also use the Open Origination Financial Software to access other capabilities that such software may have or that a FI provides, by making the Open Origination Financial Software accessible to both account holders and non-account holders alike. The open origination function, specifically allows even non-account holders to download and/or use the Open Origination Financial Software as they desire and to manage certain of (or all as the case may be) their financial circumstances regardless of whether their accounts are held with other FIs.

Offering that certain software functionality to the entire banking community, including an FI's present account holders and potential future account holders, could be an excellent venue for banks and other financial institutions to introduce themselves and a significant part of their software offering to potential future account holders. Further, it results in providing end consumers with a wider range of choices in software. They can choose from Open Origination Financial Software or Standard Banking Software from other FIs.

As each FI usually develops and pays for Standard Banking Software anyway, Open Origination Financial Software will impose little additional cost or burden on the FI. A very unrestricted and easy user adoption of its Standard Banking Software (converted to Open Origination Financial Software) or an aspect or subset thereof are easily made available, and the marketing and conversion benefit could be enormous. End-users who do not have existing accounts or relationships with the particular FI offering the Open Origination Financial Software benefit from being able to fully, or near fully, utilize that banks software that is normally reserved for only end-users with existing accounts or the like with that new FI. The new FI benefits by being able to more easily give end-users, who do not have a relationship, existing account or the like with them, a way to experience a great FI. The potential customers can enjoy a very impressive software offering that is modern, highly capable, well-designed and potentially much better than whatever that end-user's existing FI's Standard Banking Software offering is. This can result in a better general brand for the new FI, the potential desire of the end-user to switch their relationship and associated items to this new FI, and provides a constant avenue for the new FI to understand and market to this potential new end-user (potential customer). This understanding, due to the massive amount of highly relevant data, should be of extreme value to this new FI. Much, if not all, of the data should be highly contextual and relevant to the FI and will allow for highly contextual and personalized marketing to potential new customers.

Since the method of delivering the functionality is primarily expected to be via software, this data and marketing can be delivered in a manner and time as determined is best optimized for desired end-user action to be likely. This action could include, but is not limited to, account opening, account conversion, loan conversion, bill pay switching, direct deposit switching, important outside linked account switching (such as PayPal, eTrade, ShareBuilder, etc.), and the switching of other banking products or offerings. If properly used, this method of attracting origination customers to a financial institution within a financial business computing environment for a FI that does not have an existing relationship with certain non-account holding end-users, and allowing those non-account holding end-users to use a full or nearly full offering of their software, could be of immense value to that FI's future (which may include its future profitability and success) and could even prove to be one of, if not the most, important aspects of their future business.

Figure 1:
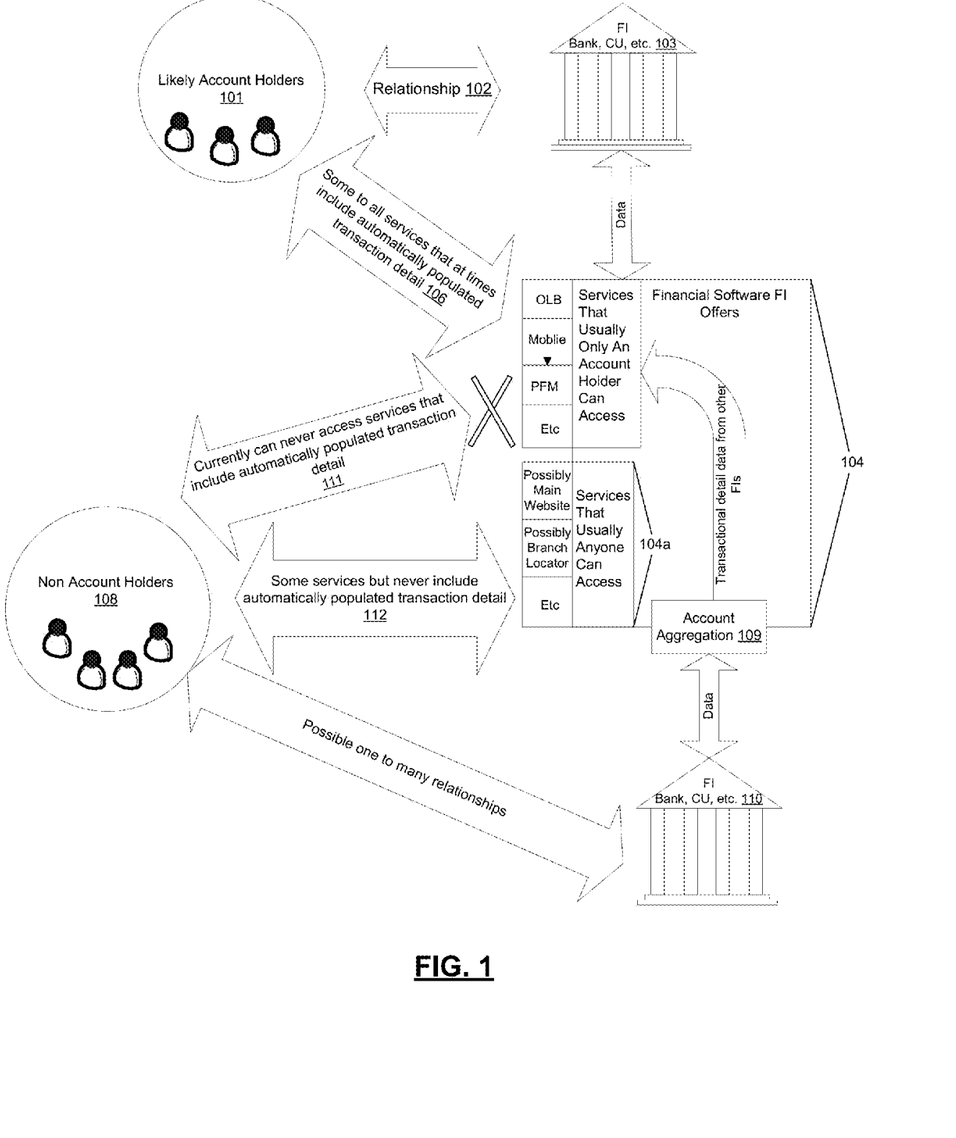
FIG. 1 illustrates a common banking relationship structure.

Referring now to the figures, in FIG. 1 a common banking relationship structure is depicted. It will be appreciated that the FI 103 in FIG. 1 has a business relationship 102 with account holders 101. Generally that relationship involves a user setting up an account with the FI, the user depositing money with the FI, the FI providing certain services, facilitating various transactions and possibly charging fees for any myriad of financial services and then in turn potentially paying interest to the account holders based on the value of their financial deposits. In modern banking, a computer system 104 includes Standard Banking Software for remote and/or mobile access by account holders 101. Such Standard Banking Software supports remote or mobile access by account holders. The account holders 101 can use the Standard Banking Software to conduct various financial transactions 106. The Banking Software on the computer system 104 will support remote and mobile banking functions including account viewing, money transfers, bill pay, investing, etc. Account aggregation 109 from third party data sources 110 allows the Standard Banking Software to serve account holders with bill pay, PFM and other transaction support that is not exclusive to the FI 103, but may come from stock brokers, credit unions, other banks, 110, etc. Typically, FIs will allow non-account holders 110 access to the computer system where the Standard Banking Software will provide very minimal services, such as allowing the non-account holder to go to the FI's main web page 104a or to use a branch locator function. This abbreviated functionality is not conducive to developing a relationship with those non-account holders 108, who have relationships with other FIs 110, possibly many more financial relationships with other FIs.

FIs may recognize that their account holders 101 are a minority of the general public, and that they desire to have an online offering for the general public. In the known technology that FIs currently utilize, as mentioned above, this online offering has been minimal and extremely limited in capabilities. Non-account holders 108 could typically access a bank computer system 104 for the purpose of viewing certain information about the FI and certain product offerings only, and perhaps to use a branch locator or some other similar functionality. However, features, functions or products that require the viewing or using of transactional data (individually or in aggregate), such as online banking, mobile banking, or other financial services functionality was provided only to account holders of that particular FI 108.

The structures and relationships shown in FIG. 1 are simplified for discussion purposes and the diagram is not intended to reflect the full complexity of many banking computer systems.

Figure 2:
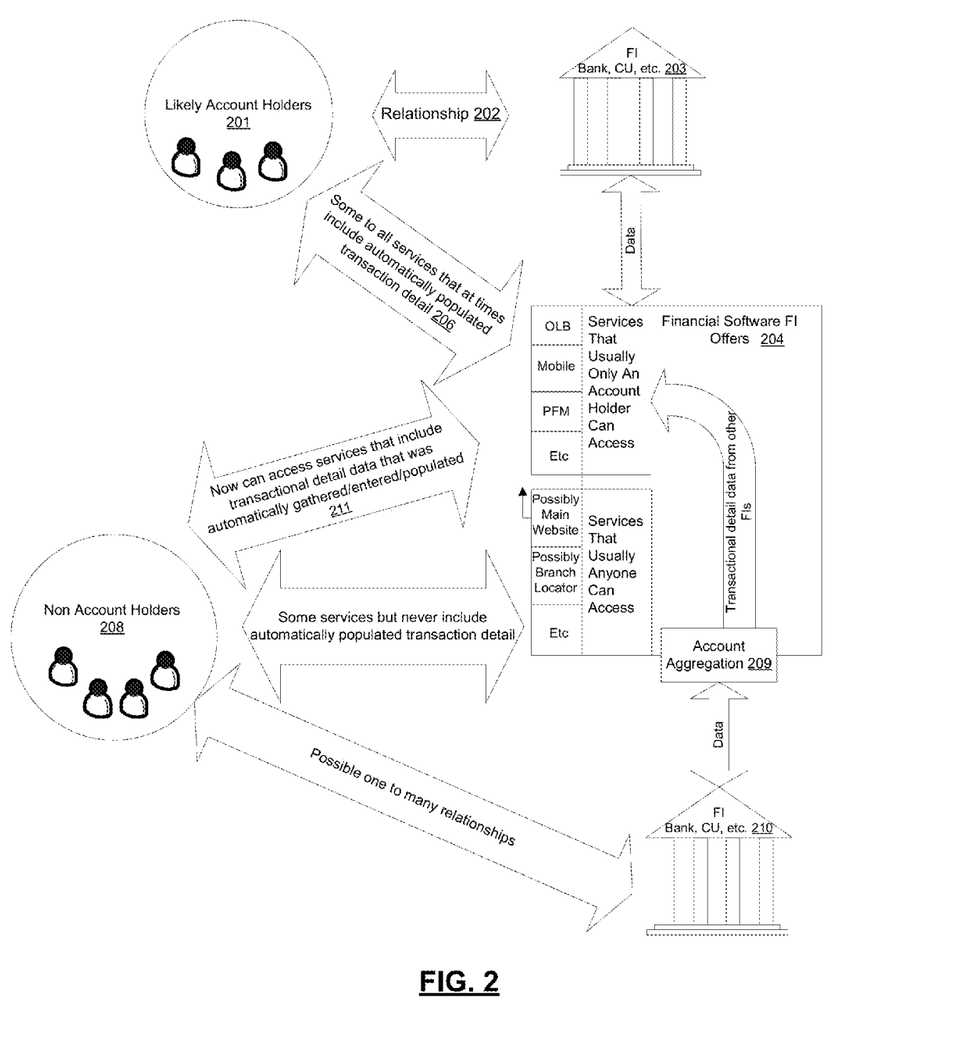
FIG. 2 illustrates an implementation of system and method of providing a flexible open origination software application in the financial and/or banking industry in accordance with the teachings and principles of the disclosure.

Referring now to FIG. 2, an example implementation of the disclosure is provided. In accordance with the teachings and principles of the disclosure now in place, now non-account holders 208, with respect to or in relation 202 to the FI 203, are able to use Open Origination Financial Software 204 to conduct transactions 206 and otherwise utilize the software. The Open Origination Financial Software 204 may be built to use or view transactional detail data that is not manually gathered or entered into the Open Origination Financial Software 204. The disclosure recognizes that some of the non-account holders 201 are likely the FI's desired future customers and are a mechanism by which the FI is likely to grow its business. The disclosure also recognizes that the entire general public, including non-account holders, are part of a growing trend toward mobile banking, budgeting, personal financial management, net worth analysis, etc. Therefore the disclosure broadens the FI's reach into new potential users of their product offering that relies on transactional detail data.

The Open Origination Financial Software 204 of the disclosure gathers user data 209 of third party FIs 210 through mechanisms such as account aggregation or other means. Due to such data access, non-account holders 208 of the FI 210 providing the Open Origination Financial Software 204 can now access their various account data and conduct transactions 211 as well as otherwise take advantage of the functionality of the Open Origination Financial Software 204.

In this way, the FI, through its computer system or product offering, allows both account holders and non-account holder ability to access and/or download the FI's Open Origination Financial Software. The Open Origination Financial Software will include a set of functionality determined by the FI to be desirable, such as, but is not limited to, transactional detail (that was gathered, entered or acquired in a non-manual way), which may include certain information such as (but is not limited to) date of the transaction, amount of the transaction, description of the transaction and category of the transaction, etc. The Open Origination Financial Software may also provide other functions, which may include, but is not limited to, capabilities such as account balance, net worth calculations, spending and budgeting information or other desirable functionality provided to account holders. The FI may permit the Open Origination Financial Software to be downloaded, opened and utilized, by both account holders and non-account holders alike, remotely through a Computing Device or via any other method such as wirelessly through a mobile electronics device.

The accessibility to download the Open Origination Financial Software, which may be considered a software application or app, can provide the Computing Device with the access to and functionality of the Financial Software, which may or may not also include desirable features such as mobile banking, investing, budgeting, net worth analysis, bill pay, account viewing, PFM capabilities, etc. The Open Origination Financial Software will permit the user to gain access to the necessary data, aggregate (or generate, acquire and/or populate in some other non-manual method) into the Open Origination Financial Software and to perform the functions supported by such Financial Software. Any user can enjoy the access to and the functionality of the Open Origination Financial Software including ability to access and view the typical transactions that a banking customer might expect.

The flexible Open Origination Financial Software of the disclosure allows access through any type of Computing Device to an Open Origination Financial Software, that a FI makes available or offers in some fashion, and makes it accessible to account holders, and then offers that access to any user regardless of account holder status. Accordingly, both account holders and non-account holders, alike, can download and utilize the Open Origination Financial Software from a Computing Device in order to enjoy its features and functionality and in turn the non-account holder becomes familiar with the experience of doing business with the FI that provides such Financial Software.

The method, system and software of the disclosure allows any user, regardless of where his/her accounts are held, to use the software or Open Origination Financial Software and benefit from its functionality (whether complete or partial) and certain (or all) of its feature set. This disclosure provides a previously non-existent intermediate step of allowing any user to download and actually utilize the software application or Open Origination Financial Software offered by a FI even by those who do not have an account with the FI. Through this disclosure, an Open Origination Financial Software system is offered to any individual on a Computing Device through a particular FI and is provided to both account holders and non-account holders alike. Accordingly, now non-account holders of a particular FI can use the offered by such an FI to manage their financial circumstances, or certain aspects thereof, rather than being limited to the software product offerings, if any, of the FI where their accounts are held.

The disclosure may be viewed as a system including hardware and software, a stand-alone software app, or a series of steps in a method to accomplish the functions described above.

Figure 3:
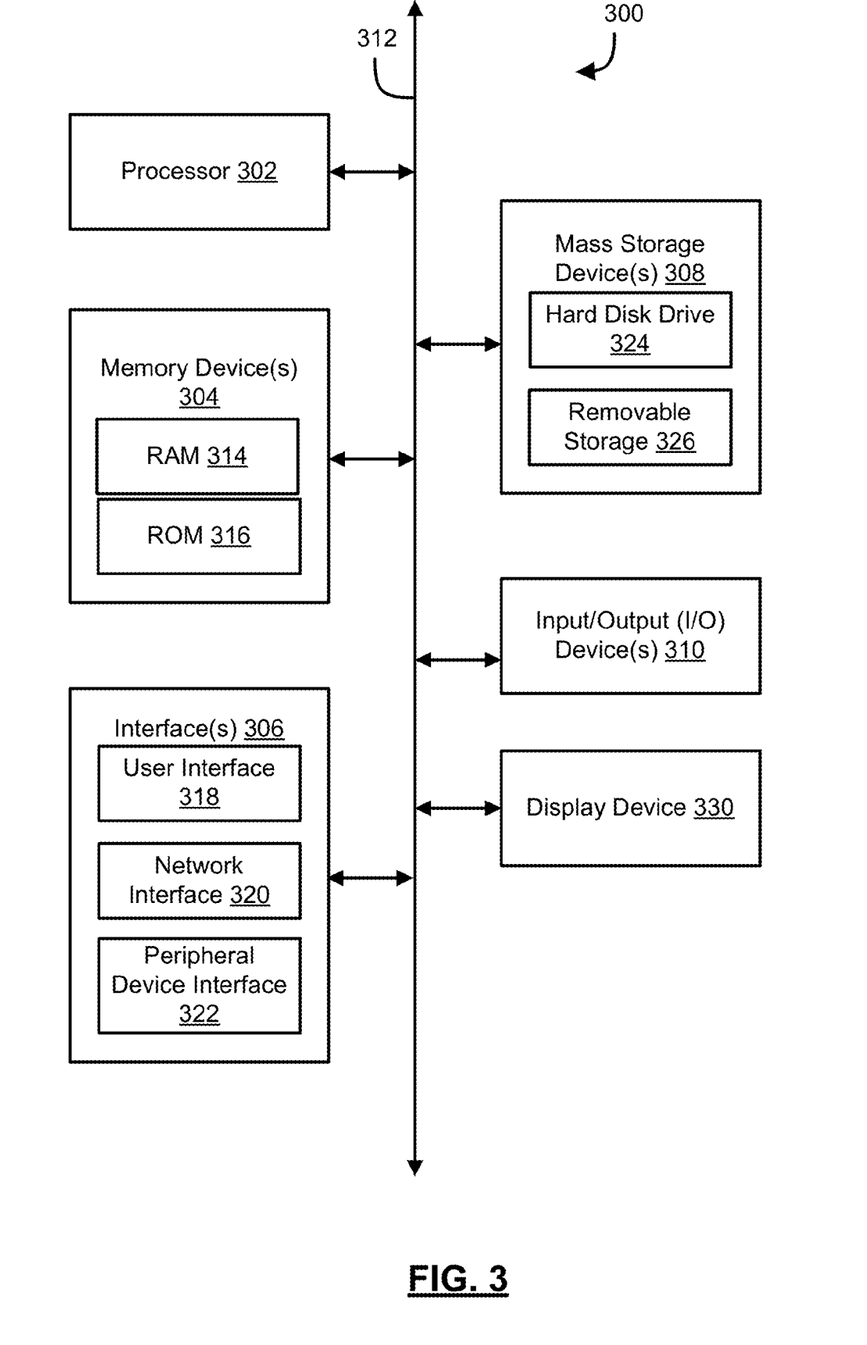
FIG. 3 illustrates an example block diagram of a computing device in accordance with the teachings and principles of the disclosure.

FIG. 3 is a block diagram illustrating an example computing device 300. Computing device 300 may be used to perform various procedures, such as those discussed herein. Computing device 300 can function as a server, a client, or any other computing entity. Computing device 300 can perform various monitoring functions as discussed herein, and can execute one or more application programs, such as the application programs described herein. For purposes of this disclosure, computing device 300 can be one or more of any of a wide variety of computing devices, such as a desktop computer, a notebook computer, a server computer, a handheld computer, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer-readable media, such as cache memory.

Memory device(s) 304 include various computer-readable media, such as volatile memory (e.g., random access memory (RAM) 314) and/or nonvolatile memory (e.g., read-only memory (ROM) 116). Memory device(s) 304 may also include rewritable ROM, such as Flash memory.

Mass storage device(s) 308 include various computer readable media, such as magnetic tapes, magnetic disks, optical disks, solid-state memory (e.g., Flash memory), and so forth. As shown in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, microphones, monitors or other display devices, speakers, printers, network interface cards, modems, lenses, CCDs or other image capture devices, and the like.

Display device 330 includes any type of device capable of displaying information to one or more users of computing device 300. Examples of display device 130 include a monitor, display terminal, video projection device, and the like.

Interface(s) 306 include various interfaces that allow computing device 100 to interact with other systems, devices, or computing environments. Example interface(s) 306 may include any number of different network interfaces 320, such as interfaces to local area networks (LANs), wide area networks (WANs), wireless networks, and the Internet. Other interface(s) include user interface 318 and peripheral device interface 322. The interface(s) 306 may also include one or more user interface elements 318. The interface(s) 306 may also include one or more peripheral interfaces such as interfaces for printers, pointing devices (mice, track pad, or any suitable user interface now known to those of ordinary skill in the field, or later discovered), keyboards, and the like.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 300, and are executed by processor(s) 302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 4:
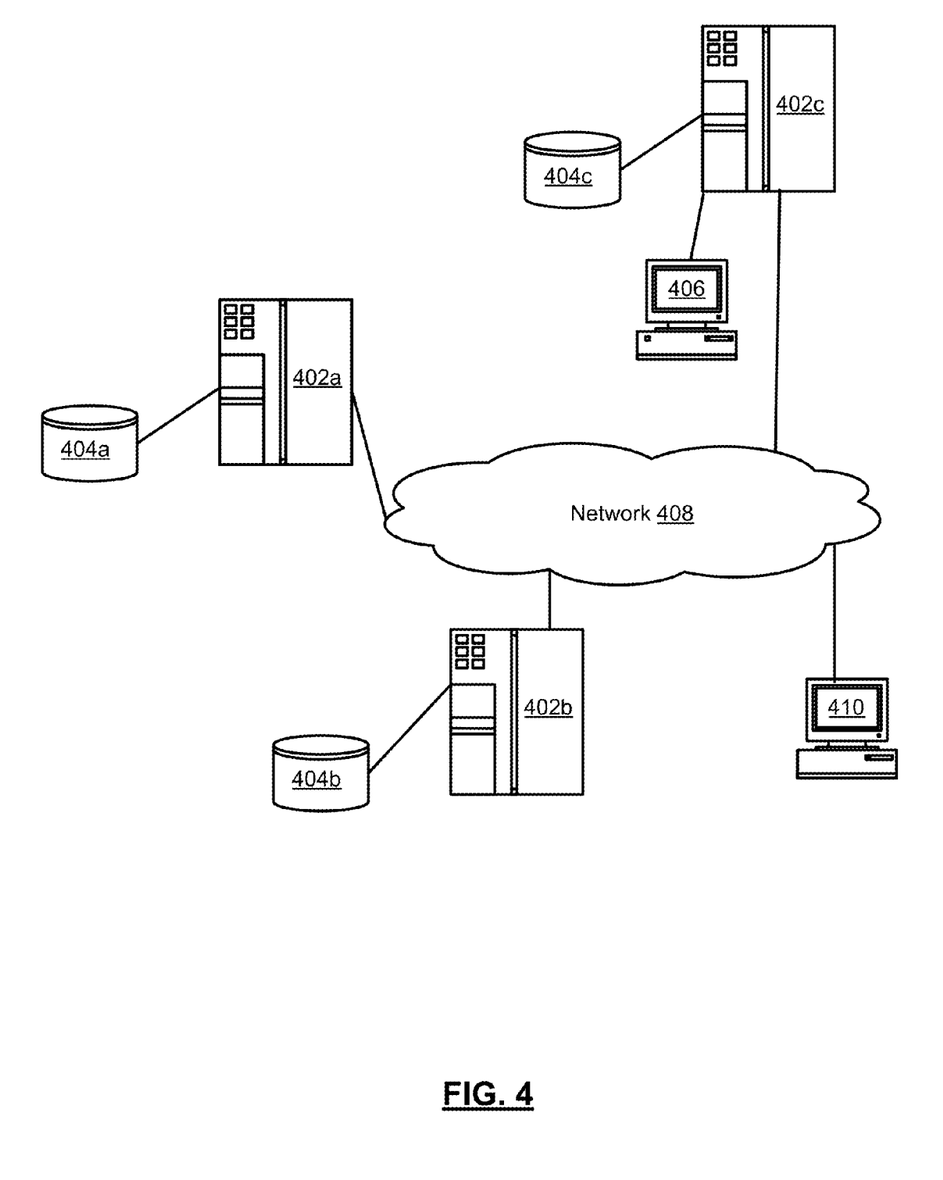
FIG. 4 illustrates an example computer architecture that facilitates different implementations described herein in accordance with the teachings and principles of the disclosure.

Referring now to FIG. 4, there is illustrated an example of a computing environment 400 suitable for implementing the described data transactions, including the systems and methods disclosed herein. In some implementations, a server 402a provides access to a database 404a in data communication therewith. The database 404a may store item information and may record information, such as data relating to one or more financial transactions. The database 404a may additionally store information contained in a plurality of records for a class or subgroup of users or customers. The server 402a may provide access to the database 404a to users and customers. The server 402a may require logins based on membership or license in order to provide access. The server 402a may provide and allow access to original source systems such as, for example, a financial or banking institutions core data systems or the like that provide data relating to a financial transaction. For example, the server 402a may implement a web server for receiving requests for data stored in the database 404a and formatting requested information into web pages that may be provided to users or customers. The web server may additionally be operable to receive information and store the information in the database 404a.

A server 402b provides access to a database 404b in data communication therewith. The database 404b may store data and information and may record such data and information. The database 404b may additionally store information contained in a plurality of data records. The server 402b may provide users access to the database 404b. The server 402b may require logins based on membership or license in order to provide access. The server 402b may provide and allow access to original source systems. For example, the server 402b may implement a web server for receiving requests for data stored in the database 404b and formatting requested information into web pages that may be provided to users. The web server may additionally be operable to receive information and store the information in the database 404b.

A server 402c may be associated with an entity for providing reporting services and user requested reports. The server 402c may be in data communication with a database 404c. The database 404c may store data or information regarding a financial transaction and/or other types of data or information for account holders and non-account holders of a particular FI. The server 402c may analyze this information as well as data retrieved from the database 404a and database 404b in order to perform the methods as described herein. An operator may access the server 402c by means of a workstation 406 that may be embodied as any general purpose computer, mobile computer, tablet computer, smart phone, or the like. The server 402c may require logins based on membership or license in order to provide access. The server 402c may provide and allow access to original source systems such as, for example, financial transaction data or other financial or personal data. For example, the server 402c may implement a web server for receiving requests for data stored in the database 404c and formatting requested information into web pages that may be provided to users. The web server may additionally be operable to receive information and store the information in the database 404c.

It will be appreciated that the server 402a, server 402b and server 402c may communicate over a network 408 such as the Internet or some other local area network (LAN), wide area network (WAN), virtual private network (VPN), or other network. A user may access data and functionality provided by the servers 402a, 402b, 402c by means of a workstation 410 or other computing device in data communication with the network 408. The workstation 410 may be embodied as a general purpose computer, mobile computer, tablet computer, smart phone or the like. For example, the workstation 410 may host a web browser for requesting web pages, displaying web pages, and receiving user interaction with web pages, and performing other functionality of a web browser. The workstation 410, workstation 406, servers 402a, 402b, 402c and databases 404a, 404b, 404c may have some or all of the attributes of the computing device 300.

Figure 5A:
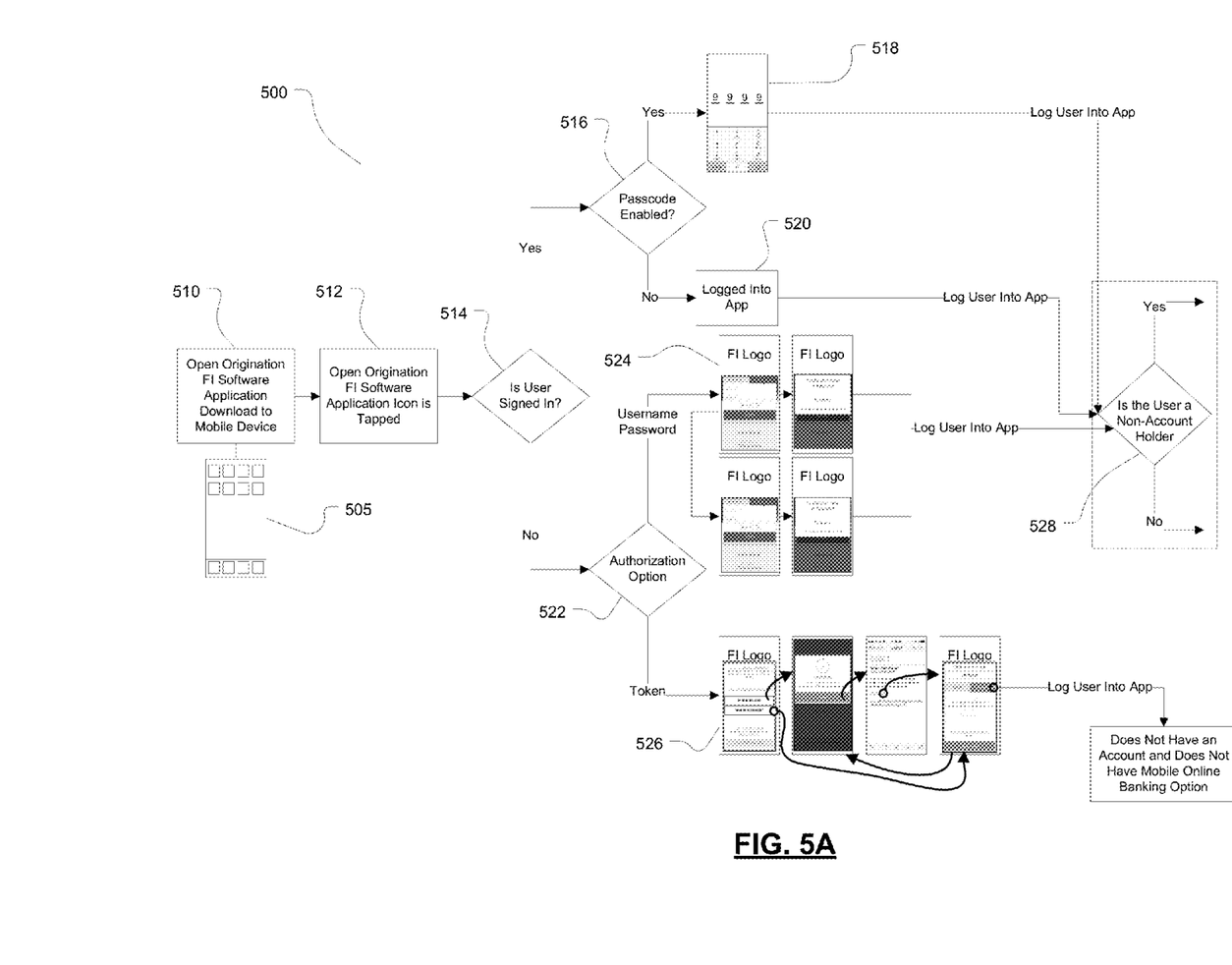
FIGS. 5A through 5C illustrate flow charts of example methods of attracting origination customers to a financial institution within a financial business computing environment according to one implementation consistent with the teachings and principles of the disclosure.
Figure 5B:
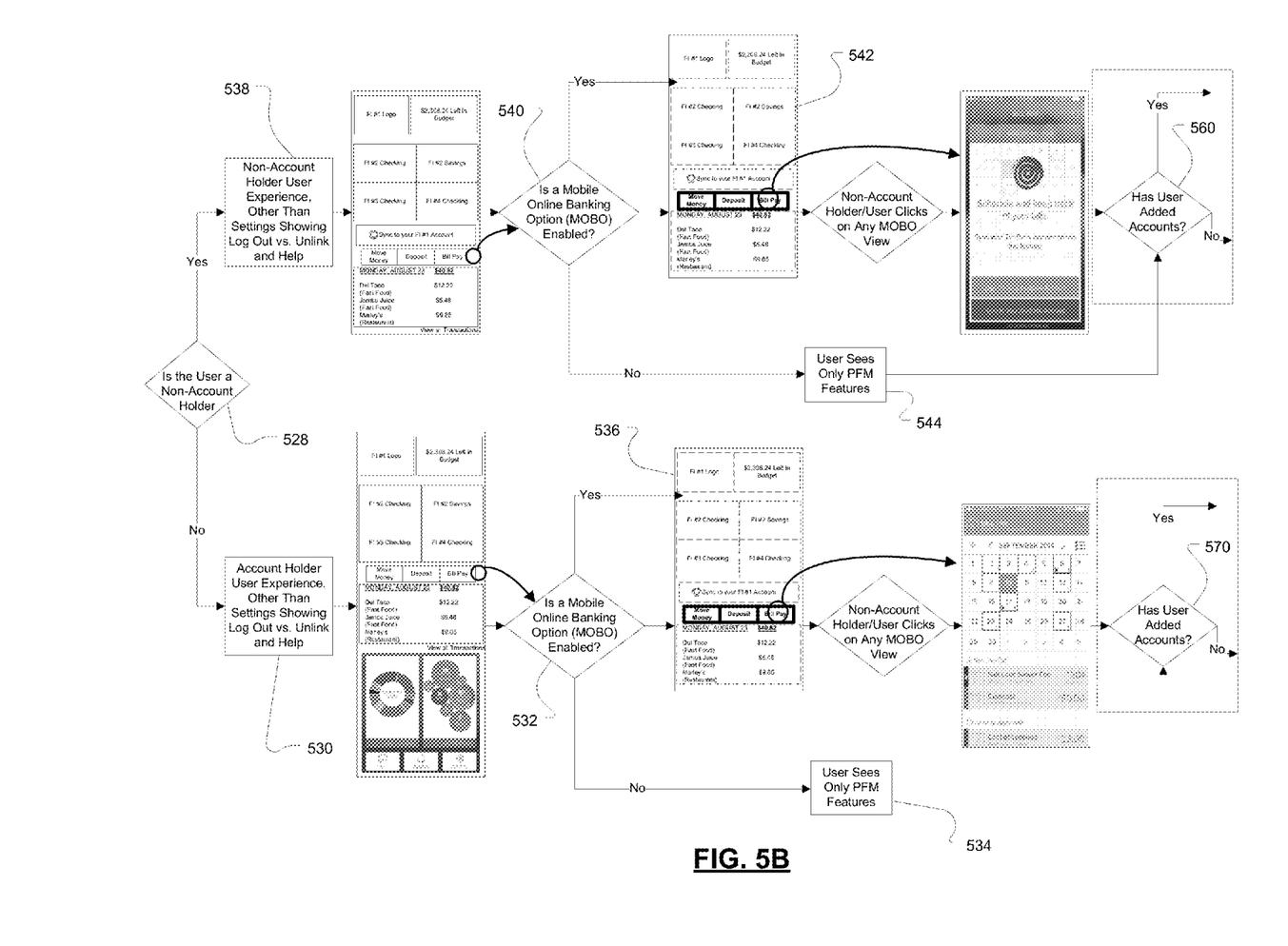
Figure 5C:
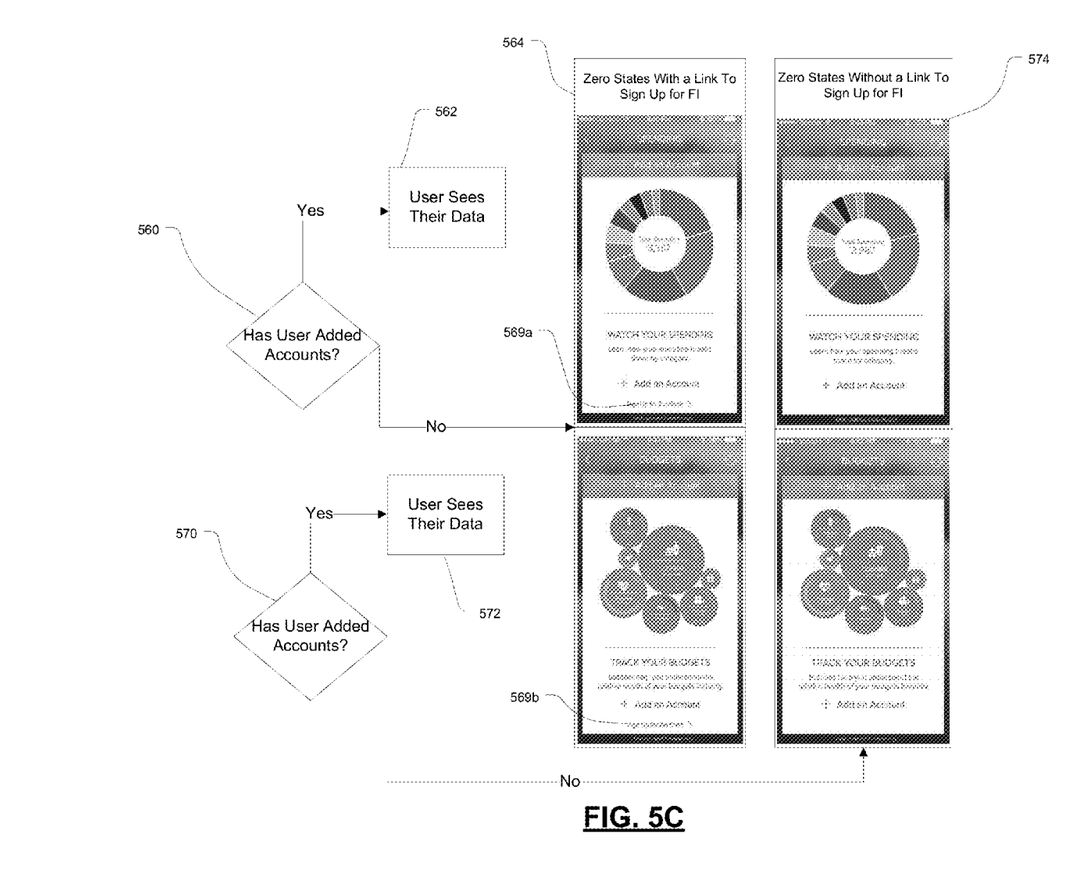

Referring now to FIGS. 5A through 5C, the figures illustrate a flow chart of an example method 500 of attracting origination customers to a financial institution within a financial business computing environment. It will be appreciated that the flow charts in FIGS. 5A through 5C are related to each other. That portion of the flow chart illustrated in FIGS. 5A through 5C surrounded by a box of dashed lines represents the starting point the next successive portion of the flow chart. For example, the decision of whether the user is a non-account holder illustrated in FIG. 5A (and surrounded by dashed lines) is the starting point in FIG. 5B and so forth.

In FIG. 5A, the Open Origination Software Application offered by a financial institution may be downloaded by a user at 510 to a mobile computing device 505. It will be appreciated that the user of the Open Origination Software Application may be a non-account holder or an account holder of the financial institution offering the software application. At 512, the user may open the application by tapping the icon on the mobile device 505. Upon opening the software application, the software authenticates and determines whether the user is signed into the application at 514. If the user is signed into the application, then the software determines whether the mobile computing device is passcode enabled at 516. If so, then the user enters the passcode and the user is logged into the application at 518. Then at 528, the software determines whether the user is a non-account holder at the financial institution offering the software application. If the mobile computing device is not passcode enabled, then the user is logged into the application at 520. Then at 528, the software determines whether the user is a non-account holder at the financial institution offering the software application.

If, at 514, the user is not authenticated or signed into the application, then there may be an authentication or authorization option at 522 that is checked or determined. It will be appreciated that while checking authentication, the system and method may also determine whether there is an internet connection, whether the user is authorized and how, whether the user is an account holder of the financial institution or not, whether and to what extent there are mobile online banking options and features that are available, and whether and to what extent there are personal financial management features that are available. At 524, one option may be a username and password option, where a user may enter the username and password if the user already has an online banking option or account with its financial institution. Once the username and password are entered or a username and password has been set up for the first time and established, then the user is logged into the application. Then at 528, the software determines whether the user is a non-account holder at the financial institution offering the software application.

At 526, a token may be exchanged to authenticate. For example, a user may be asked to input an email or mobile phone number where a passcode or token may be sent. The passcode may be delivered as a link that is input directly into the software application, such that the user only need to tap or press the submit button, without retyping or copying and pasting the passcode into the location requesting the access code. At this point, the user is logged into the application, but may not have an account and may not have a mobile banking option, but may enjoy the features available as part of the application itself, such as PFM or other features. Once the token or access code has been accepted, then the user is logged into the application. Then at 528, the software determines whether the user is a non-account holder at the financial institution offering the software application.

Referring now to FIG. 5B, at 528 the software determines whether the user is a non-account holder at the financial institution offering the software application. If the user is determined to be an account holder of the financial institution offering the software application, then at 530 the user is identified as a current customer of the financial institution. Customers of the financial institution enjoy the full access and capability that the software application has to offer, including all mobile banking online options (MOBO) that may be enabled at 532. If there are no MOBO features enabled, then at 534 the user may only be able to see and use the PFM features that are built into the software, provided that there are no other accounts the user has added.

At 532, if there are MOBO features enabled then at 536 the user may use the software to move money from one account to another, make a deposit with the financial institution, or use the bill pay features.

At 528, if the user is determined to be a non-account holder of the financial institution offering the software application, then the user is identified as a potential customer of the financial institution. The non-account holder of the financial institution is allowed essentially full access to the features of the software as account holders, as illustrated in FIG. 5B. If the user is determined to be a non-account holder of the financial institution offering the software application, then at 538 the user is identified as a potential customer of the financial institution. At 540, the system determines whether mobile online banking options (MOBO) are enabled. If MOBO is enabled, then at 542 the user (non-account holder) is urged or asked whether to open an account with the financial institution. In this manner, potential customers of the financial institution are able to enjoy the full access and capability that the software application has to offer without first becoming a customer of the financial institution, with the exception of mobile banking online options (MOBO) that may not be enabled until a current account at the financial institution is opened. Thus, the financial institution is allowed to gently sell its products and services to the potential customer who is using the full functionality of its software.

At 540, the system determines whether mobile online banking options (MOBO) are enabled. If there are no MOBO features enabled, then at 544 the user may only be able to see and use the PFM features that are built into the software, provided that there are no other accounts the user has added.

Referring now to FIGS. 5B and 5C, at 560 and 570, respectively, the user (whether an account holder or a non-account holder) is asked whether to enter user account data, whether such data is held at the financial institution or at one or more third party financial institution(s).

Illustrated in FIG. 5C is an implementation of the methods and systems disclosed herein showing how a non-account holder experience is very similar to that of an account holder. As illustrated, if a non-account holder has decided to add account data into the application software at 560, the system will output the added account data to the user at 562. In like manner, if an account holder has decided to add an account data, or even third party account data, into the application software at 570, the system will output the added account data to the user at 572. In contrast however, if the user, either a non-account holder or an account holder, have chosen not to add an account at 560 and 570 respectively, any available account data for the user will be out put to the user at 564 and 574 respectively. It should be noted, as illustrated in the figure, that the example output to the non-account holder 564 and output to the account holder 574 are very similar, and may differ with the non-account holder being offered the option of signing-up with the providing financial institution at 569*a* and 569*b*.

Figure 6:
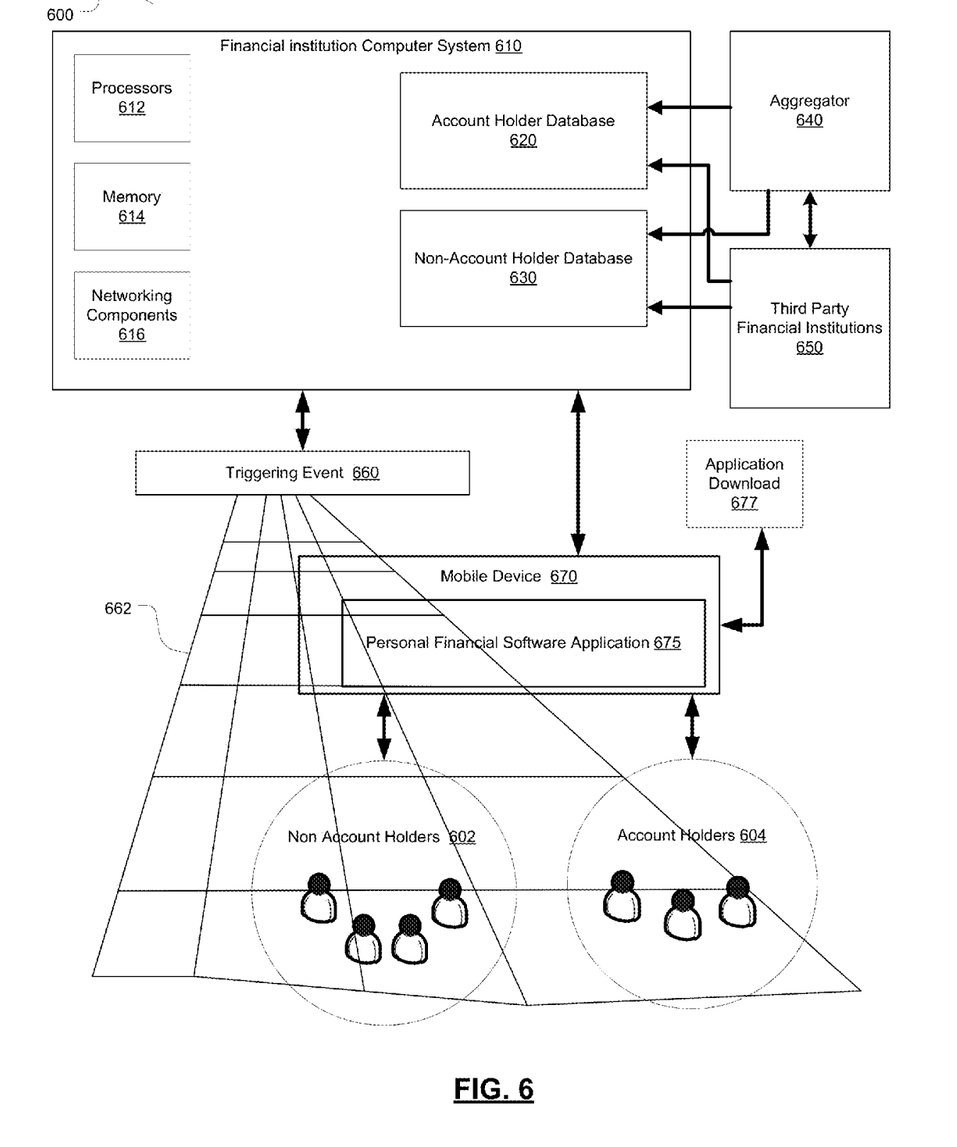
FIG. 6 illustrates an example system for attracting origination customers to a financial institution within a financial business computing environment according to one implementation consistent with the teachings and principles of the disclosure.

FIG. 6 illustrates a system for attracting origination customers to a financial institution within a financial business computing environment. The system 600 may comprise a financial institution computer system 610 connected over a network (shown generally as connecting arrows in the diagram). The system 600 may comprise a first 620 database of account holder data that is accessible by said financial institution computer system 610, wherein said account holder data may comprise information relating to individuals that hold accounts 604 with said financial institution. The system may further comprise a personal financial software application 675, also referred to herein as Open Origination Financial Software, configured to access said first database 620 in order to provide account holders 604 with information concerning their accounts.

In an implementation, the system 600 may further comprise a second database 630 of non-account holder data that comprises non-account holder information relating to individuals that do not hold accounts 602 with said financial institution, and wherein the non-account holder data has been entered by non-account holder 602 as a user of the personal financial software application 675.

In an implementation, the personal financial application software 675 may be downloaded from and application download location 677 that is connected to the network. It should be noted that application download location 677 may be provided from within the financial institution's computer system 610 or from third party providers. In an embodiment, the personal financial software application 675 may be configured to be used with a mobile device 670, and wherein said personal financial institution software application 675 is capable of collecting aggregated financial data corresponding to said non-account holder 602 from a group consisting of data aggregators 640 and third party financial institutions 650 that correspond to the non-account holder 602. It should be noted that the personal financial software may be configured to run on any computing device that is configured to be connected over a network and to the internet. Additionally, the non-account holder aggregated financial data may be accessible through the personal financial software application 675, and wherein said personal financial software application 675 supports financial transactions by said account holders 604 and said non-account holders 602, such that the financial institution software application 675 provides substantially the same functionality to account holders 604 and non-account holders 602 alike.

Figure 7:
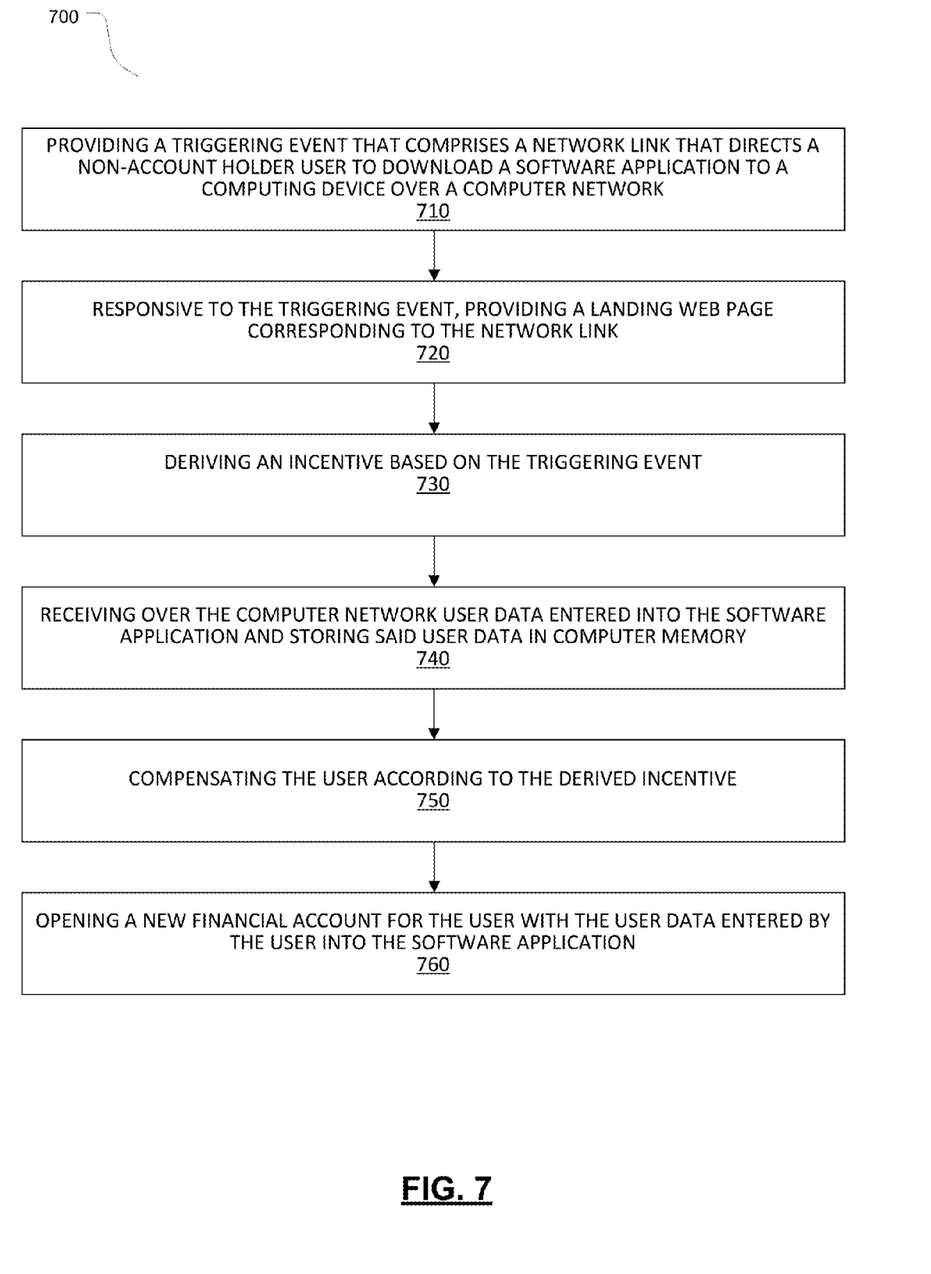
FIG. 7 an example method for attracting origination customers to a financial institution within a financial business computing environment according to one implementation consistent with the teachings and principles of the disclosure.

Referring now to both FIG. 6 and FIG. 7, it should be noted that the financial institution computing environment 610 will comprise computer processors 612, memory 614, and network components 616 for performing the computer instructions for attracting new customers by providing a triggering event 660 that may comprise a network link, such as a URL, that directs a non-account holder user 602 to download the personal financial software application 675 to a computing device over the computer network at 710 of method 700 as shown in FIG. 7. Then, responsive to the triggering event, at 720 the system may provide a landing web page corresponding to the network link. The landing web page may be the financial institution's own web page or it may be a third party app provider or store where mobile apps may be downloaded or used.

In an embodiment, the triggering event 660 may be an advertisement that is presented to a user under certain circumstances, or based on characteristics of the user. For example, as discussed above, a user may be incentivized to download and use the personal financial software application 675 after an advertisement is displayed on a movie screen in a theater that the user is sitting in. Alternatively, the triggering event may be a push notification that may have been derived from the actual purchase of the tickets for the movie. Accordingly, at 730 an incentive 662 that is based on, or correlates with, the triggering event 660 may be derived for presentation to a user or plurality of users. For example, because the triggering event 660 is related to seeing a movie in the previous example, the derived incentive may be reimbursement for the movie ticket purchase that triggered the trigger event. In the figure, the incentive 662 is portrayed as a net that is cast out from a triggering event 660, and may be cast over account holders 604 and non-account holders 602 alike in certain implementations.

At 740 the system may receive over the computer network user data entered into the personal financial software application 675, and may store said user data in computer memory 612. In an implementation the user may provide personal financial data in to the software application 675 such as current account information, identification information, demographic information, and the like.

At 750, the system may cause the process of compensating the user according to the derived incentive as promised at the triggering event and on the landing web page of the provided link 720. An advantage of allowing non-account holder user's to use the personal financial application software 675, is that the data entered by the user may be used to easily open an account (at 760) with the financial institution that has taken upon the burden of providing and supporting the personal financial application software, such that non-account holder user 602 becomes an account holder user 604.

An additional advantage an embodiment of the system may provide is the ability of tracking user financial activity through the user data entered into the personal financial software application. In an implementation, triggering events 660 and incentives 662 may be derived from user characteristics such as the user's location, the user's purchase, user's previous location, the user's online behavior, on the outcome of a secondary event, such as a sporting event or other event with an unknown outcome.

Additionally, in an implementation of the system a provider may wish to determine whether a user is already an account holder so that the incentive may be adjusted accordingly, such as disqualifying the user from receiving the incentive.

It will be appreciated that the foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims or exemplary embodiments appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the disclosure requires more features than are expressly recited in each claim or exemplary embodiment. Rather, as the following claims reflect, inventive aspects lie in less than all features of a single foregoing disclosed implementation. Thus, the following exemplary embodiments are hereby incorporated into this Detailed Description by this reference, with each embodiment standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of flexible open origination, the method comprising:
   determining a triggering event associated with a user who does not have an account with a financial institution based on one or more characteristics of the user;
   in response to the triggering event, generating a notification that directs the user to download a software application to a mobile computing device over a computer network, the notification comprising a network link to a landing page where the software application can be downloaded, the software application comprising a financial management software application for managing one or more accounts associated with the user that are held at different financial institutions, the software application accessible by the user from within the financial institution's system even though the user does not have an account with the financial institution;

deriving an incentive for downloading and using the software application, the incentive associated with the one or more characteristics of the user and correlated to the triggering event;

notifying the user of the incentive for downloading and using the software application;

receiving authentication information from the user for the software application from within the software application;

in response to verifying validity of the authentication information entered into the software application, logging the user into the software application;

receiving, over the computer network, user data entered into the software application; and in response to the receiving of the user data, determining that the user has downloaded and used the software application and compensating the user according to the incentive.

2. The method of claim 1, wherein the software application allows non-account holders of the financial institution to add financial account information as the user data into the software application.

3. The method of claim 1, wherein the incentive is based on a characteristic of the user.

4. The method of claim 1, wherein the triggering event includes a determination that the mobile computing device is in a particular location.

5. The method of claim 1, wherein the triggering event includes a determination of a purchase by the user.

6. The method of claim 1, wherein the triggering event includes a determination that the mobile computing device was in a particular prior location.

7. The method of claim 1, wherein the triggering event includes a determination of online behavior of the user.

8. The method of claim 1, further comprising opening a new financial account for the user with the user data entered by the user into the software application.

9. The method of claim 8, wherein the new financial account is opened with a provider of the software application.

10. The method of claim 1, wherein the incentive is based on an outcome of a secondary event.

11. The method of claim 1, further comprising, upon selection by the user of the network link on the mobile computing device, automatically downloading the software application from a third party app store to the mobile computing device over the computer network.

12. The method of claim 1, wherein the triggering event includes a determination that the user responded to an advertisement regarding the software application that was presented to the user.

13. The method of claim 1, wherein the triggering event includes a determination that the user responded to a push notification regarding the software application that was presented to the user.

14. The method of claim 1, wherein the authentication information entered into the software application includes a passcode of the mobile computing device.

15. The method of claim 1, wherein the authentication information entered into the software application includes a username and a password.

16. The method of claim 1, wherein the verifying of the validity of the authentication information entered into the software application includes:

receiving an email address entered into the software application;

sending an email that includes a token to the email address;

receiving the token entered into the software application; and verifying the validity of the token entered into the software application.

17. The method of claim 16, wherein the token is included in the email as a link that is configured, upon selection by the user, to be automatically received by and entered into the software application without requiring the user to manually enter the token into the software application.

18. A method of flexible open origination, the method comprising:

determining a triggering event associated with a user who does not have an account with a financial institution based on one or more characteristics of the user;

in response to the triggering event, directing a user to download a mobile app from a third party app store to a mobile computing device over a wireless network, the mobile app comprising personal financial management software ("PFM") for managing one or more accounts associated with the user that are held at different financial institutions, the mobile app accessible by the user from within the financial institution's system even though the user does not have an account with the financial institution;

deriving an incentive for downloading and using the mobile app, the incentive associated with the one or more characteristics of the user and correlated to the triggering event;

notifying the user of the incentive for downloading and using the mobile app;

in response to verifying validity of authentication information entered into the mobile app, logging the user into the mobile app;

receiving, over the wireless network, user data entered into the mobile app; and in response to the receiving of the user data, determining that the user has downloaded and used the mobile app and compensating the user according to the incentive.

19. The method of claim 18, wherein the PFM software allows non-account holders of the financial institution to add financial account information as the user data into the mobile app.

20. The method of claim 18, wherein the one or more characteristics of the user comprises one or more of a location of the user, a purchase of the user, a previous location of the user, online behavior of the user, and an outcome of a sporting event.

21. The method of claim 18, wherein the triggering event includes a determination that the mobile computing device is in a particular geographic location or was in a particular prior geographic location.

22. The method of claim 18, further comprising opening a new financial account for the user with a provider of the mobile app using the user data entered by the user into the mobile app.

23. The method of claim 18, wherein the triggering event includes a determination that the user responded to an advertisement regarding the mobile app that was presented to the user or a determination that the user responded to a push notification regarding the mobile app that was presented to the user.

24. The method of claim 18, wherein the authentication information entered into the mobile app includes a passcode of the mobile computing device, a username and a password, or some combination thereof.

25. The method of claim 18, wherein the verifying of the validity of the authentication information entered into the mobile app includes:
- receiving an email address entered into the mobile app;
- sending an email that includes a token to the email address;
- receiving the token entered into the mobile app; and
- verifying the validity of the token entered into the mobile app.

26. The method of claim 25, wherein the token is included in the email as a link that is configured, upon selection by the user, to be automatically received by and entered into the mobile app without requiring the user to manually enter the token into the mobile app.

* * * * *